United States Patent [19]

Prosek et al.

[11] 4,084,852

[45] Apr. 18, 1978

[54] ROLL-OVER PROTECTION STRUCTURE FOR DUMP TRUCK

[75] Inventors: John R. Prosek, Glen Ellyn; James C. Tamburino, Roselle, both of Ill.

[73] Assignee: International Harvester Company, Chicago, Ill.

[21] Appl. No.: 707,802

[22] Filed: Jul. 22, 1976

[51] Int. Cl.[2] ............................................. B60P 1/00
[52] U.S. Cl. ................................. 298/22 C; 292/144; 296/28 D; 298/38
[58] Field of Search ............... 292/144, 302, DIG. 32; 298/22 R, 38, 22 C; 296/28 D, 28 C; 105/273; 180/89.14, 89.17, 89.18

[56] References Cited

U.S. PATENT DOCUMENTS

| | | | |
|---|---|---|---|
| 2,490,532 | 12/1949 | Maxon, Jr. | 296/28 D X |
| 2,749,175 | 6/1956 | King et al. | 298/38 X |
| 3,117,820 | 1/1964 | Toland et al. | 298/38 |
| 3,638,983 | 2/1972 | Flournoy et al. | 292/144 X |

FOREIGN PATENT DOCUMENTS

| | | | |
|---|---|---|---|
| 2,107,690 | 8/1972 | Germany | 298/38 |

*Primary Examiner*—Frank E. Werner
*Attorney, Agent, or Firm*—Ronald C. Kamp; Floyd B. Harman

[57] ABSTRACT

A dump truck having a canopy on the dump body which extends over an operator's cab is provided with a latch means for holding the dump body in its lowered transport position and is released only in response to initiating the intentional pivoting of the dump body to its raised position.

3 Claims, 3 Drawing Figures

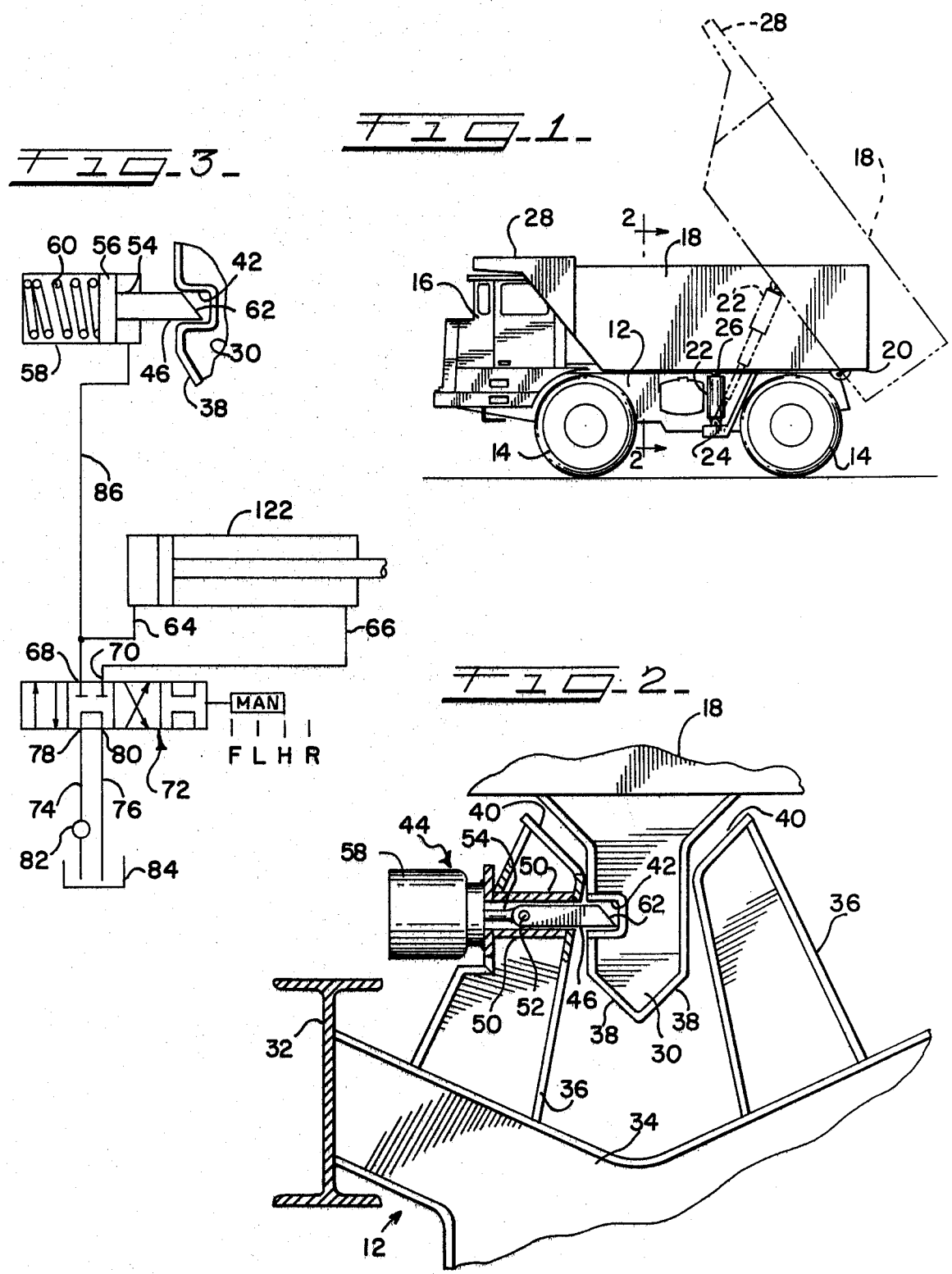

ROLL-OVER PROTECTION STRUCTURE FOR DUMP TRUCK

BACKGROUND AND SUMMARY OF THE INVENTION

This invention relates generally to roll-over protection structure for dump trucks, generally, and more particularly to a means for utilizing existing structure on dump trucks to enhance such roll-over protection.

Dump trucks of the off-highway type have a weight in and of themselves which approaches the payload, i.e., if the payload is 45 tons, then the empty weight of the vehicle will be approximately 72,000 pounds and fully loaded will be approximately 162,000 pounds. Providing roll-over protection for the cab has been a problem due to the weight of the vehicle and the resulting high loads encountered by any ROPS built into the cab itself. Conventionally, such dump trucks have been provided with a canopy on the dump truck which extends at least partially over the top of the cab, which canopy functions to protect the cab from being impacted by objects, such as large rocks etc. falling upon it during the loading of the dump body. Such canopies have therefore been structurally strong and securely affixed to the dump body and consequently could assist or complement any ROPS built into the cab. However, to function thusly the dump body and specifically the canopy secured thereto must remain in close proximity to the cab regardless of the orientation of the truck itself relative to the ground.

The dump bodies for such trucks are conventionally raised to their dump position by multi-stage hydraulic cylinders gravity being relied upon in some cases to return the dump bodies to their lowered transport position. With such arrangement there is almost total reliance upon gravity to hold the dump body in its lowered position, and in the event of a roll-over, it is obvious that the dump body may readily move away from its normal transport position in close proximity to an overlying cab. Even if a double acting cylinder were utilized to both raise and lower the dump body, it is highly likely that the integrity of hydraulic system would be damaged during such rollover, thereby causing the loss of positive pressure to hold the canopy in its protective position relative to the cab.

It is, therefore, an object of this invention to provide improved roll-over protection for an operator cab on a dump truck, particularly, through utilization of existing structures of the dump body.

It is also an object of this invention to provide such roll-over protection by assuring that the dump body is securely latched and will be maintained in its normal lowered position relative to the cab during a roll-over.

It is a further object of this invention to provide a latch for a dump body which is automatically engaged upon lowered of the body and is released only in response to initiation of the intentional pivoting of the dump body to its dump position.

These and other objects of the present invention and many of the intended advantages thereof, will be readily apparent from a perusal of the following description when considered in connection with the accompanying drawings wherein:

FIG. 1 is a side elevational view of an off highway dump truck incorporating the present invention;

FIG. 2 is a partial cross sectional view taken on line 2—2 of FIG. 1 illustrating one form the holddown latch may take; and FIG. 3 is a schematic representation of a hydraulic circuit usable with the present invention.

DESCRIPTION OF A PREFERRED EMBODIMENT

Referring now to FIG. 1, there is shown an off highway dump truck, indicated generally at 10, having a frame 12 which is supported by wheel axles 14. An operator's cab 16 is mounted on the bored end of the frame 12 and a dump body 18 is pivotally mounted to the frame at 20 and is movable between a lowered transport position, as shown in solid lines, and an elevated or raised dump position, as indicated by dotted lines.

A multistage, double acting hydraulic cylinder 22 is pivotally connected at 24 to the frame 12 and is pivotally connected at 26 to the underside of the dump body 18. A canopy 28 is affixed to the dump body 18 and extends at least partially over the top of the operator's cab 16 in relatively close proximity thereto when the dump body 18 is in its lowered transport position.

Referring now to FIG. 2, the dump body 18 is provided with a central rib 30 which extends downward from the dump body toward the frame 12. The frame 12 includes a pair of side rails, one of which is shown at 32, and a cross member 34 extending between and affixed to the side rails 32. A pair of centering towers 36 are secured to and extend upward from the cross member 34. These towers define a space there between for reception of the central rib 30 and serve to center the dump body on the frame 12 and to retain the dump body in such position whenever side loads may be imposed thereon. The central rib 30 is provided with slanted surfaces 38 which diverge in an upward direction and the towers 36 with complementary slanted surfaces 40 which converge in a downward direction to guide the central rib 30 into the space between the two towers 36 as the dump body is lowered to its transport position.

The central rib 30 is provided with a recess 42 on one side thereof and the tower 36 adjacent to the recess carries a latch mechanism, indicated generally in 44, including latch bolt 46 capable of engaging the recess 42. The latch bolt 46 is reciprocable within a slide way or guide formed in part by the walls 50. In order to minimize binding, the latch bolt 46 is pivotally connected by pin 52 to the rod 54 of a piston 56, as best seen in FIG. 3, which is reciprocable within a cylinder 58.

The piston 56 is urged toward its extended position by a compression spring 60 trapped between the head end of the cylinder 58 and the piston 56. The outer end of the latch bolt 46 has an angled or slanted surface 62 which is engagable by the left hand slanted surface 38, as viewed in FIG. 2. As the dump body 18 is lowered to its transport position, the aforementioned surface 38 will engage the angled surface 62 camming the latch bolt 46 to the left against the bias of the spring 60 until the latch bolt registers with the recess 42. This registry occurs when the dump body is in its transport or fully lowered position and under such circumstances, the spring 60 forces the latch bolt 46 into the recess 42. Hence the latch mechanism 44 automatically latches the dump body to the frame as the dump body pivots into its transport position.

A preferred embodiment for release of the latch mechanism 44 is shown schematically in FIG. 3. The dump body cylinder is represented by a simple double acting cylinder 122 having hydraulic lines 64 and 66 respectively connected to the head and rod ends thereof. These lines 64 and 66 are connected to ports 68 and 70 of a four position hydraulic valve 72. Another pair of hydraulic lines 74 and 76 are connected to the ports 78 and 80 respectively of the valve 72. A pump 82 supplies hydraulic fluid under pressure to port 78 through hydraulic line 74 and port 80 is connected to reservoir 84 through hydraulic line 76. A conduit 86 provides fluid communication between the rod end of cylinder 58 and the port 68 of the valve 72.

In FIG. 3 the valve 72 is shown in its H or Hold position in which port 78 and 80 are blocked and port 78 is connected to port 80. This position locks the hydraulic cylinder from any movement and permits the flow from the pump 82 to be returned to the reservoir 84. When the valve 72 is moved to the R or Raised position, port 78 is connected with port 68 and port 70 is connected with port 80. Hence hydraulic fluid under pressure is simultaneously directed to both the head end of the hydraulic cylinder 122 to cause extension thereof and to the rod end of cylinder 58 causing the piston 56 to be forced to the left against the bias of spring 60. Hence the latch bolt 46 will be retracted from the recess 42 as the hydraulic cylinder 122 starts its extension to raise the dump body 18. When the valve 72 is thereafter moved to its L or Lower position the ports 68 and 80 are interconnected and the ports 70 and 78 are interconnected thereby providing fluid communication between the reservoir 84 and both the headend of cylinder 122 and the rod end of latch cylinder 58. With the accompanying reduction in pressure in the rod end of latch cylinder 58, spring 60 is capable of urging the latch bolt 46 outward so that it will be capable of engagement with the recess 42 when the dump body reaches its lowered transport position.

It can be seen that the present invention provides a means for assuring that the canopy remains over the cab to provide roll-over protection; the latch preventing the dump body from pivoting away from its transport position, and the central rib and towers assuring that the side loads encountered during roll-over will not deflect the canopy laterally to the side and thereby expose the cab.

Variations within the spirit and scope of the invention described are equally comprehended by the foregoing description.

What is claimed is:

1. In a truck having a frame, an operator's cab mounted on the frame and a dump body capable of being pivoted between a lowered transport position and a raised dump position, the improvement comprising;

a canopy rigidly secured to the dump body and projecting forwardly over at least a portion of said cab;

a central rib affixed to, and extending a substantial distance along the underside of said body and projecting outward therefrom;

a pair of centering towers rigidly affixed to the frame and defining a pocket therebetween for reception of said rib, said towers and said rib, when positioned in said pocket, serving to maintain the dump body in its normal transport position upon application of a side load to the dump body;

slanted surfaces on said rib and said towers for guiding said rib into said pocket as the body is pivoted to its lowered position;

a guideway carried by one of said towers;

a latch bolt reciprocable within said guideway;

a recess in said rib capable of registry with said latch bolt;

a latch cylinder having a piston and a rod affixed to said one tower;

a compression spring trapped within said latch cylinder behind said piston; and means for directing fluid pressure to the latch cylinder to retract said latch bolt from said recess.

2. In a truck according to claim 1 and further comprising:

at least one hydraulic cylinder connected between said frame and said body, which cylinder is movable to cause said body to be moved to its raised dump position;

a manually actuated valve for selectively directing hydraulic fluid pressure to said hydraulic cylinder to cause said body to be moved to its raised dump position;

conduit means connecting said latch cylinder in parallel with said hydraulic cylinder, whereby said latch bolt is automatically retracted when said valve is actuated to direct hydraulic fluid pressure to move said body to its dump position.

3. In a truck according to claim 1 and further comprising:

hydraulic cylinder means connected between said frame and said body;

a hydraulic circuit including a pump and a reservoir;

a manually actuated valve in said circuit for selectively connecting the cylinder means to one of said pump and reservoir and conduit means connecting said latch cylinder in parallel with said hydraulic cylinder means whereby said latch bolt is automatically retracted as said dump body is urged toward its raised dump position and said spring may extend said latch bolt outward as said dump body is urged toward its lowered transport position.

* * * * *